Jan. 30, 1962 — R. C. KOCH ET AL — 3,018,813
DIAPHRAGM FOR TUBELESS TIRES

Filed Jan. 28, 1958 — 3 Sheets-Sheet 1

INVENTORS
ROBERT C. KOCH
ROBERT P. WHIPPLE
BY
W. A. Fraser
ATTY-

Jan. 30, 1962 R. C. KOCH ET AL 3,018,813
DIAPHRAGM FOR TUBELESS TIRES
Filed Jan. 28, 1958 3 Sheets-Sheet 2
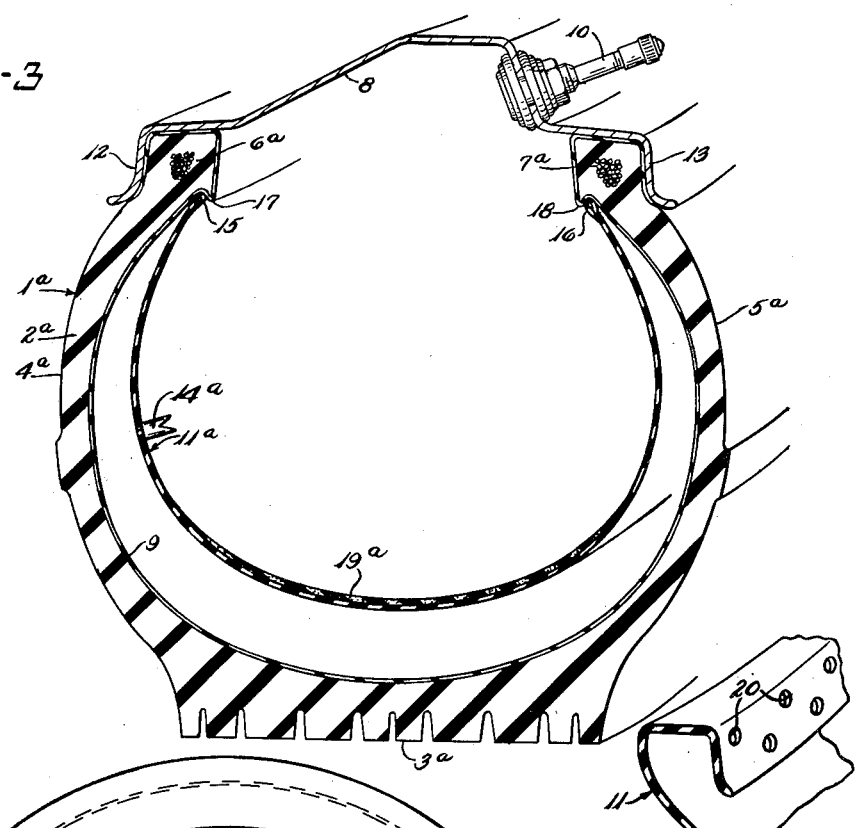
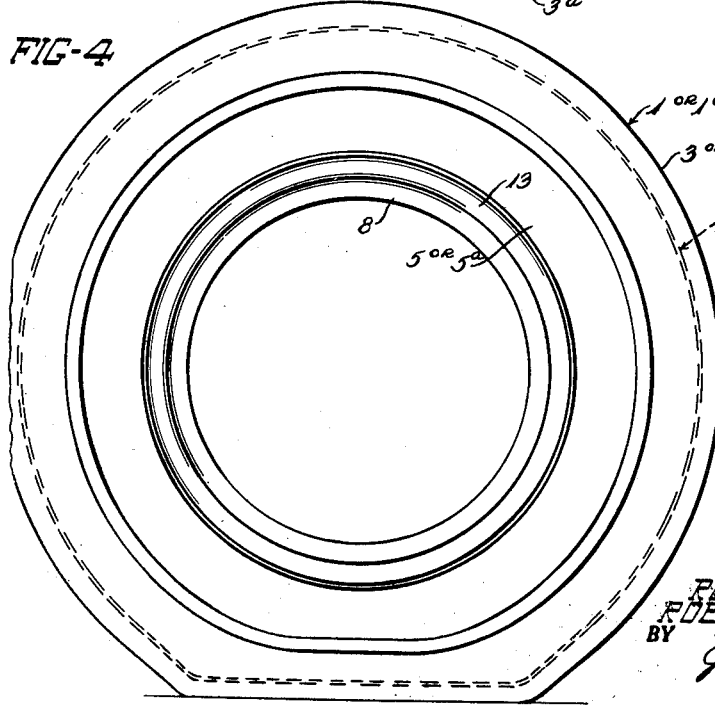
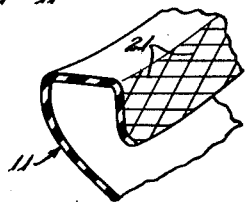
INVENTORS
ROBERT C. KOCH
ROBERT P. WHIPPLE
BY W. A. Fraser
ATTY.

Jan. 30, 1962   R. C. KOCH ET AL   3,018,813
DIAPHRAGM FOR TUBELESS TIRES

Filed Jan. 28, 1958   3 Sheets-Sheet 3

INVENTORS
ROBERT C. KOCH
ROBERT P. WHIPPLE
BY W. A. Fraser
ATTY.

United States Patent Office 3,018,813
Patented Jan. 30, 1962

3,018,813
DIAPHRAGM FOR TUBELESS TIRES
Robert C. Koch and Robert P. Whipple, Akron, Ohio, assignors to The Firestone Tire & Rubber Company, Akron, Ohio, a corporation of Ohio
Filed Jan. 28, 1958, Ser. No. 711,681
6 Claims. (Cl. 152—341)

This invention relates to a support member for a tire and more particularly to an extensible diaphragm adapted to support a tubeless tire for wheel operation after the body of such a tire is suddenly ruptured by blowout.

This is a continuation in part of our copending application, U.S. Serial Number 492,240, filed March 4, 1955, and now abandoned.

The conventional device designed to provide blowout protection for a tubeless tire is an inextensible diaphragm reinforced with fabric mounted in the tire to divide the air containing cavity of the tire into an inner chamber defined by the inextensible diaphragm and the rim and an outer chamber defined by the diaphragm and the tire casing. The inextensible diaphragm is impervious to air and has a slow leak orifice to provide for controlled inflation of both chambers of the tire during the tire inflation procedure and also to provide for the slow leak of air from the inner chamber after the tire has failed from puncture or blowout and the air pressure in the outer chamber has dropped to atmospheric pressure. The edges of this inextensible diaphragm may be anchored on ledges on the inside surface of the tire, cemented to the inside surface of the tire itself or extend under the beads of the tire to be anchored between the tire and the rim.

Certain patents such as United States Patent Number 2,334,893 to Arey and United States Patent Number 2,674,292 to Sutton disclose extensible safety rings for pneumatic tires. These rings although extensible are not designed to do anything more than support the wheel of the car until it is quickly brought to a stop. The present invention provides a support member which not only expands to support the tire upon blowout but which will bridge the hole in the tire and allow that member to be operated until a filling station or tire change location can be reached.

A disadvantage of the prior art inextensible diaphragm has been the cost of the diaphragm which is of fabric construction requiring much hand labor in building. Also, great strain is thrown onto the inextensible diaphragm after decompression of the outer chamber from the resulting drop of the load upon blowout of the tire from support by the tire to support by the diaphragm. The force resulting from the drop of the load has been sufficient at times to rupture the inextensible diaphragm and make it inoperative with disastrous results.

These and other disadvantages of the prior art are overcome in the present invention by an extensible diaphragm composed solely of rubber-like material which fits in the tire casing and has a peripheral extent less than the peripheral extent of the air cavity in the tire and which upon decompression of the outer chamber has sufficient stretch to take a position against the inner surface of the tire but is stiff enough not to bulge out the hole in the tire. One result of this unexpected action is a cushioned lowering of the load as pressure in the outer chamber drops. Because the diaphragm may be composed solely of an extensible, stretchable rubber-like material in one form of the invention, manufacturing costs may be lowered by use of molding techniques.

It is, therefore, an object of the invention to supply an extensible diaphragm for a tubeless tire which cushions the drop of the supported load when the tire blows out. It is, also an object of the invention to provide an extensible safety diaphragm for a tubeless tire comprised of material readily adapted to shaping in the factory by molding techniques.

A further object of the invention is to provide an extensible diaphragm of less peripheral extent than the air cavity of a tubeless tire in which it is mounted and which is comprised of compounded stretchable rubber-like material which quickly expands to support the tire casing of a tubeless tire upon blowout to enable the vehicle to proceed on its way to the next service station.

These and other objects of the invention will be more easily understood upon reference to the specification, claims and drawings of which:

FIGURE 3 is a sectional view of a tubeless tire mounted on a rim mounting an extensible diaphragm on two ledges adjacent the bead of the tire.

FIGURE 4 is an elevation view of a tire mounting an extensible diaphragm of the invention after the outer chamber has lost air pressure.

FIGURES 5 and 6 are fragmentary perspective views of the edges of the support member of one modification of the invention.

Figure 1:
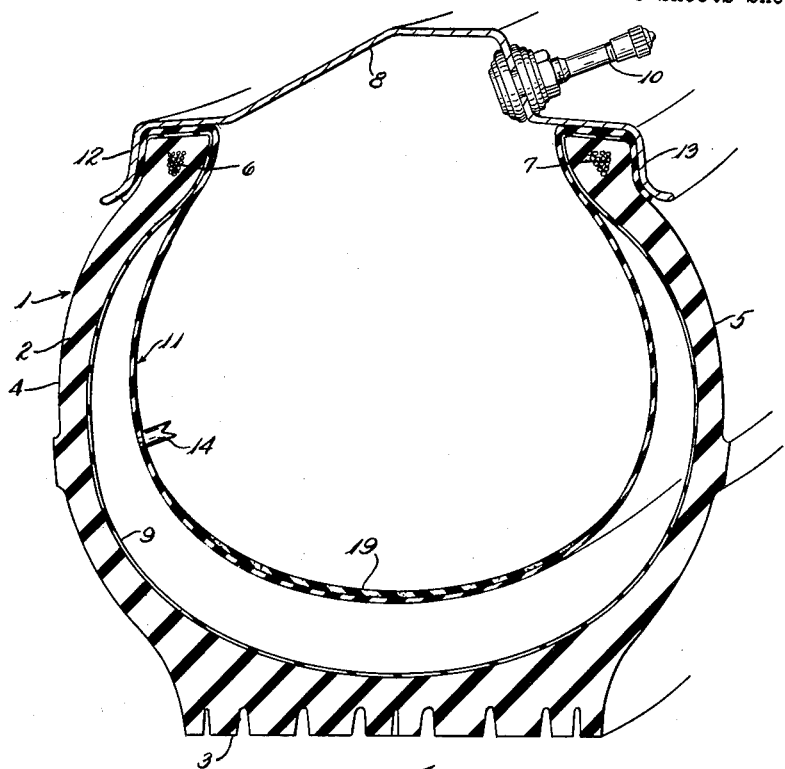
FIGURE 1 is a sectional view in perspective of a tubeless tire mounted on a rim in combination with an extensible diaphragm of the invention.
Figure 2:
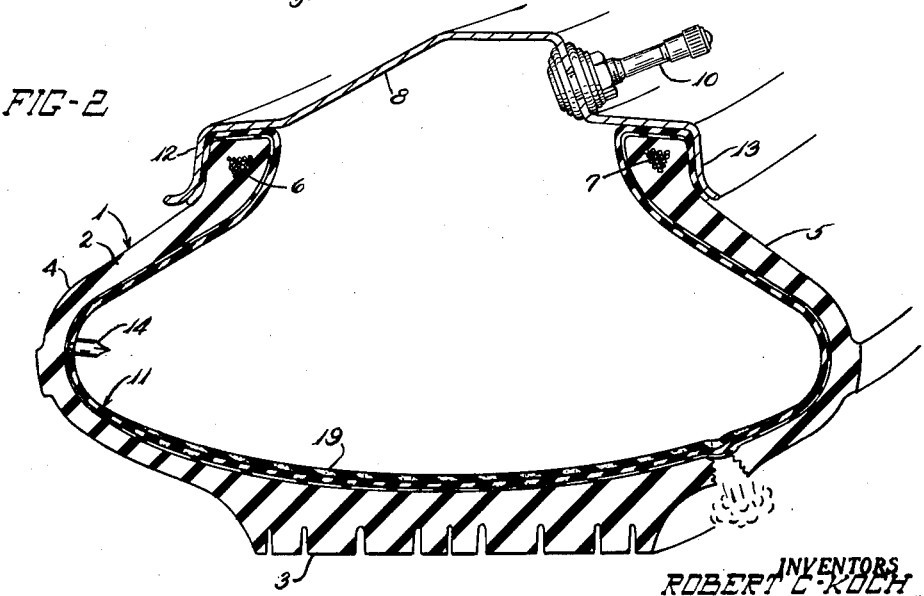
FIGURE 2 is a sectional view in perspective showing the position of the diaphragm immediately after rupture of the tire casing and at the beginning of decompression of the outer chamber.

With reference to FIGURES 1, 2 and 3, a tubeless tire generally indicated at 1 is comprised of a fabric body portion 2 upon which is superimposed and bonded by vulcanization a tread portion 3 and sidewall portions 4 and 5. Fabric body portion 2 terminates at its edges in inextensible bead portions 6 and 7 for mounting the tire on rim 8 in air tight relation. An air-impervious liner 9 usually of butyl rubber is adhered as by cementing or vulcanization to the inner surface of the fabric body portion 2 extending from bead to bead to provide with rim 8 an air cavity. A valve 10 is mounted in the rim to provide for inflation of the tire.

The air cavity defined by rim 8 and tire 1 is divided into radially inner and outer annular chambers by a removable diaphragm 11 which extends from bead to bead and is anchored for example between the beads 6—7 of the tire and the flanges 12—13 of the rim. The diaphragm 11 must have a shorter peripheral extent than the peripheral extent of the air cavity of the tire in which it is mounted. A slow leak orifice in the form of flutter valve 14 provides for controlled pneumatic communication betwen the inner and outer chamber. Inflation of the tire is accomplished by forcing air under pressure through valve 10 into the inner chamber from whence it flows through the flutter valve 14 into the outer chamber. It will be seen that the air pressure of the inner and outer chamber will slowly equalize as the tire is inflated.

In operation of the extensible diaphragm of the invention the tire body suddenly is ruptured by blowout as shown in FIGURE 2 and the air contained in the outer chamber of the air cavity escapes. As a pressure differential builds up betwen the inner and outer chamber the extensible diaphragm 11 quickly expands towards the inner wall surface of the tire. The decompression of the outer chamber is substantially instantaneous and therefore the extensible diaphragm will practically leap out to the support of the tire body 2.

When the outer chamber is completely decompressed to atmospheric pressure (FIGURE 3) the diaphragm is pressed firmly against the entire inner surface or periphery of the fabric body portion 2 or band ply of the tire by air pressure in the inner chamber. This pressure has dropped because of the increase in volume of that chamber but is sufficient to support the load on the wheel. For example, if the pressure in the inner and outer chambers of the air cavity of the tire before blowout is 24 lbs. and the diaphragm and rim enclose 50% of the volume of the air cavity, after the tire has blown out the pressure in the inner chamber, which has enlarged with the expansion of the diaphragm, will be 12 lbs. This is sufficient to support the load on the wheel of a 4,000 lb. passenger car until the car is brought to a stop from speeds up to 60 m.p.h. and above. Because of the wall composition of the novel support member, the tire may be reinflated to 24 lbs./sq. inch and the vehicle may proceed to a tire repair point. Upon reinflation after rupture of the outer casing the liner wall will expand to fill the tire but will not bulge out the hole in the tire wall. The flutter valve 14 will be pressed against the inside surface of the tire and no air will escape. At the proper time the tire may be deflated by removal of the valve stem from valve 10.

Whereas the prior art fabric diaphragm became a miniature load-bearing tire in itself after blowout of the tubeless tire and did not expand to contact and support the damaged tire except at the area of contact of the tire on the road, the novel extensible diaphragm expands almost instantaneously on blowout to support the tire 360° around the inner wall surface thereof. Control of the car is more uniform at a critical moment because there is no dropping of the load from the damaged tire to the diaphragm which on blowout is immediately in place against the tire body.

The material of which the extensible diaphragm is made must be such that it has sufficient elongation or stretch to move out and take a shape against and in support of the tire body. The modulus or strength of the material of the novel diaphragm at this elongation must be such that the expanded diaphragm wall will not substantially bulge out the hole caused by puncture or blowout and become pinched. A suitable material for this purpose is set forth in the following formula:

| | |
|---|---|
| Natural rubber | 100.00 |
| Carbon black | 80.00 |
| Zinc oxide | 7.00 |
| Stearic acid | 3.50 |
| Antioxidant | 2.00 |
| Softener | 6.00 |
| Retarder | 1.00 |
| Peptizer | .50 |
| Accelerator | 1.00 |
| Sulfur | 2.40 |

A compound according to the above formula was mixed on a rubber processing mill and when tested showed the following physical properties [1] when vulcanized for 60 minutes at 280° F.

| Percent elongation: | Modulus, p.s.i. |
|---|---|
| 50 | 325 |
| 100 | 800 |
| 150 | 1525 |
| 200 | 2250 |

From the above data it will be seen that the following thicknesses of material would have the indicated strength at 50% elongation.

| Thickness in inches: | Modulus at indicated thickness and at 50% elongation, pounds |
|---|---|
| .120 | 39 |
| .080 | 26 |
| .060 | 20 |
| .040 | 13 |

[1] Tested on a Scott Testing Machine using a .075 inch thick dumbbell having .25 inch width in restricted area according to ASTM test number D412–51–T.

Part of the rubbery compound was then sheeted out on a calender to a gauge of approximately .120 inch and a strip wrapped around the drum of a conventional diaphragm building machine. The ends of the strip were skived and lapped to form a splice which was covered with a rubber protective strip. The drum of the building machine was collapsed and the unvulcanized rubbery band was removed and placed in a bag inserting type curing press and vulcanized for 30 minutes at 270° F. to obtain a diaphragm having a cross sectional shape as shown in FIGURE 1. This diaphragm was mounted in a tubeless tire on a drop center rim and the wheel placed on a passenger car. Upon blowout of the tire the diaphragm performed satisfactorily to bring the car to a safe stop without swerve or perceptible drop from the tire to the diaphragm. The car was then driven a considerable distance supported only by the diaphragm. The diaphragm did not bulge out the hole made by blowout of the tire. A second diaphragm having a thickness of .80 was prepared in the afore-described manner and performed satisfactorily on blowout of the tubeless tire in which it was mounted.

When using the above disclosed natural rubber compound as a diaphragm wall the critical thickness range lies above .060 inch with from .080 to .150 inch useful and .120 inch preferred above .150 inch in thickness the diaphragm commences to assume the characteristics of an inextensible diaphragm. A thickness of .040 inch would be unsatisfactory.

However, the diaphragm of the invention must be capable of expanding at least 15% of its circumferential dimension but not over 50% of that dimension when inflated at the pressure of operation of the device after decompression of the outer chamber of the tire. A material satisfactory for the wall of the diaphragm must have a modulus (A.S.T.M. Test D412–51–T) of at least 300 p.s.i. when measured at the elongation to which it is stretched upon blow-out of the outer chamber. For example, if the inner diaphragm is not great in diameter, it must stretch about 50% of its elongation in order to reach the tire when the outer chamber is decompressed. On the other hand, if the diameter of the inner diaphragm is relatively large as compared to the tire, it need stretch only about 15% in order to reach the tire. In other words, at the elongation selected from the critical range for any particular diaphragm the material of the wall must have a modulus of at least 300 pounds per square inch. Obviously, it is not desirable to make the wall of the diaphragm 1″ thick. Consequently, after the percent elongation is chosen for a particular diaphragm a thickness must be chosen so that the modulus of that thickness, when the diaphragm is extended to the tire shall not be less than 20 lbs. Thus by way of another example, a diaphragm had to expand 50% to support the tire after blow-out and a thickness was chosen that had a modulus at 50% elongation of only 13 lbs.; the material would be unsatisfactory for the diaphragm of the invention. On the other hand, if this material had a modulus of 20 lbs. at 50% elongation and the chosen thickness it would be satisfactory. Again by way of example a material .060″ thick having a modulus of 20 lbs. selected diaphragm elongation of 15% would be satisfactory, while the same thickness of material having a modulus of 13 lbs. at 15% elongation would be unsatisfactory. The foregoing relationships of physical properties are critical because they define a material which is not only sufficiently extensible (when the diaphragm is extended to the tire) but which will bridge a hole in the tire casing and resist abrasion as the tire continues to rotate. A diaphragm having physical properties of extension outside the critical range of 15–50% will not expand to support the tire or will bulge out the hole to quickly break and cause a blowout of the tire.

Although natural rubber is the elastomer disclosed in the example such is shown by way of example only and not by way of limitation. Those skilled in the art will recognize from the example that other extensible plastic and polymeric materials modified to have physical properties disclosed herein will perform the useful function of the invention.

Figure 7:
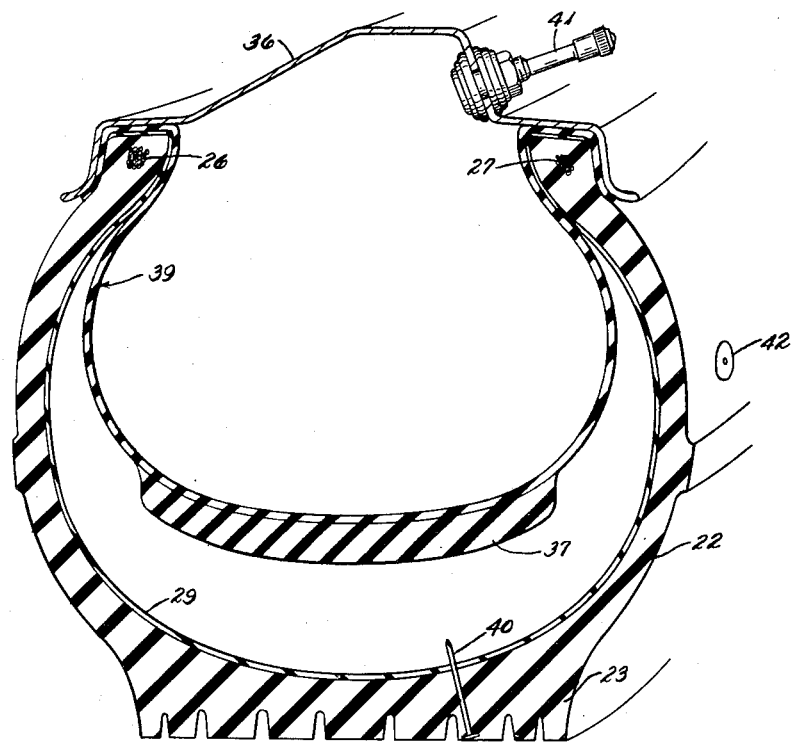
FIGURES 7 and 8 are sectional views of another modification of the invention.
Figure 8:
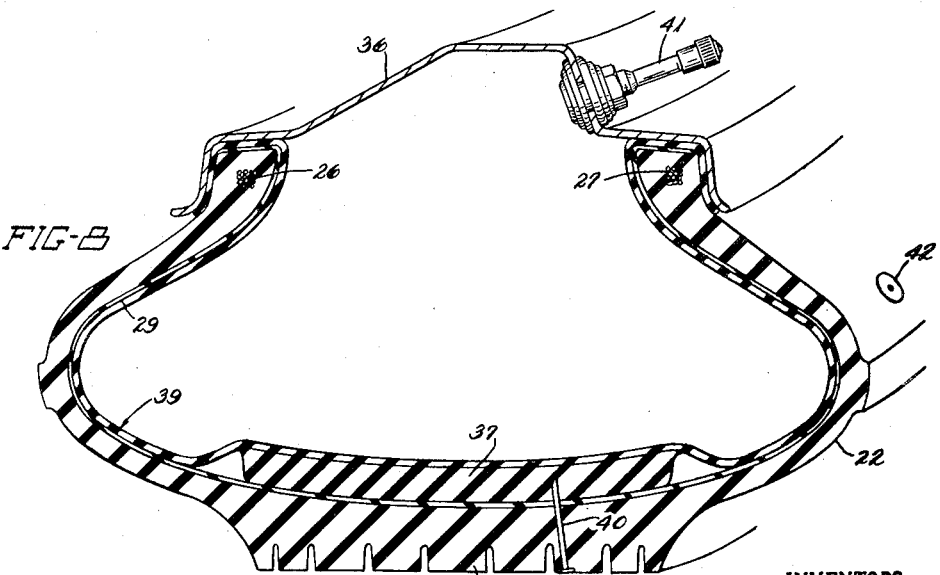

Referring to FIGS. 7 and 8 a modification of the invention is shown wherein the extensible diaphraghm is provided on its outer peripheral surface with a tread 37. The diaphragm generally indicated at 31 is comprised of a rubbery polymeric material which has the stretch characteristics of the diaphragms heretofore described. Inflation supplied to the inner chamber through valve 41, while inflation fluid is introduced into the outer chamber through a valve 42 in the sidewall. Such a valve is shown in U.S. Patent 670,725 to Pickett.

This arrangement of valves makes it possible to inflate the radially outer chamber to a higher pressure than the inner chamber. This unbalanced pressure situation is desirable for high speed operation to prevent radial "throw-out" of the tread due to centrifugal force. However, if the diaphragm is of small radius, during running of the tire it will stretch to reduce the volume of the outer chamber. This reduction in volume will increase the air pressure in the outer chamber and serve to hold the diaphragm against throw-out due to centrifugal force.

An advantage of the modification of the invention shown in FIGS. 7 and 8 lies not only in safe stop after decompression of the outer chamber but in fact it can serve as an anti-delay element. In this use after decompression of the outer chamber, inflation fluid is introduced through valve 41 into what was the inner chamber to increase the pressure of the tire. For example the inner and outer chamber may both have a pressure of 24 p.s.i before puncture. After puncture the outer chamber is decompressed to zero while the inner chamber, being enlarged drops to a pressure of about 12 pounds. The car is brought to a safe stop and fluid introduced through valve 41 to raise the pressure in the tire to 24 pounds. The vehicle continues on its way and tread 37, because of its hardness and thickness, prevents puncture of the expanded inner chamber by nail 40.

In this modification of the invention the diaphragm is seated between rim 36 and the tire beads 26 and 27. The tire is a conventional tubeless tire comprised of a fabric body portion 22, an abrasion resistant rubbery tread portion 23 and the substantially air impervious rubbery inner linear portion 29. The tread portion 37 of the diaphragm is comprised of a very hard material, such as nylon or hard rubber which is much harder than the usual tread stock found in passenger tires. Since the stock is designed to run only short distances at low speeds i.e. 200 to 300 miles at 20 to 40 m.p.h. the stock need not be extremely blowout resistant. It must, however, be extremely hard and tear resistant in order to resist puncture and tearing of a nail such as 40 which may pierce the tire. A satisfactory stock for this tread is as follows:

| | |
|---|---|
| Natural rubber | 100.00 |
| Carbon black | 85.00 |
| Softener | 3.00 |
| Zinc oxide | 3.00 |
| Stearic acid | 2.50 |
| Sulfur | 6.00 |
| Accelerator | 1.50 |

To obtain maximum hardness this stock should be cured about 100 minutes at 310° F.

Instead of the heavy tread portion 37 the invention also contemplates the use of a heavy armor such as hard plastic or even thin metal. In such a case of metal, of course, the armor cannot be carried 360° around the crown of the diaphragm but must be applied in overlapped non-adhered segments so that the diaphragm can stretch when desired.

In addition to the examples set forth, so called synthetic rubber when properly compounded may be used in the invention. Examples of such materials are rubbery copolymers of butadiene and styrene, butadiene and acrylonitrile, isobutylene and isoprene, isobutylene and styrene, and rubbery polymers of chlorobutadiene compounded to give physical properties in the desired range.

The extensible diaphragm of the invention need not have great elongation or stretch to be operative. For example, in a 6.70 size passenger tire a diaphragm which in combination with the rim encloses about 50% of the area of the air cavity of the tire when viewed in section may be constructed of a material which has as low as 15% elongation.

The extensible diaphragm may also be constructed of extensible plastic material either in the pure form or compounded or processed to have the desired elongation, strength and abrasion resistance. Examples of such plastic materials are polyamides, including nylon[1], and condensation products of dibasic acids, such as Mylar[1], vinyl chloride polymers, vinyl chloridevinylidene chloride copolymers, plastics of the polyethylene group and in particular polychloro-trifloroethylene, chlorosulfonated polythene, as well as mixtures and blends of these plastics with each other, with the aforementioned rubbery materials, or with plasticizers such as polymeric plasticizers.

A novel extensible diaphragm of the invention was made up of nylon (a polyamide material) according to the following formula:

| | Gm. |
|---|---|
| Nylon* | 262.2 |
| Nylon† | 87.9 |
| Polyglycerol | 8.5 |
| Yellow dye | 13.6 |
| Isopropyl alcohol | 290.3 |
| Distilled water | 698.5 |

\* Du Pont FM6501.
† Du Pont 8IIV55.

The formula was used to build up a diaphragm according to FIGS. 1–6 by painting the solution on a wooden form until a thickness of approximately .015" was obtained. The diaphragm was then slipped off the form and dried three days at room temperature and treated four hours in an oven at 240° F. The diaphragm then was mounted in an 8.00–15 tire on the left front position of a 1949 Buick. When the tire was blown out, the diaphragm let the wheel down slowly and the car was brought to a safe stop from a speed of 60 miles per hour. The tire beads in the diaphragm were still in place on the rim seat at the completion of the test. The length of the blowout slit in the tire which was bridged by the diaphragm was 3 inches and the diaphragm was not ruptured.

The novel diaphragm may be prepared in a number of ways in addition to the methods aforedisclosed. For example a mandrel or core of the desired inner contour of the diaphragm may be used to support plies of rubber or plastic as such are formed over its surface. The rubber or plastic form may then be removed from the core and either molded or heat treated to produce a finished diaphragm. Likewise the diaphragm may be injection or transfer molded.

The surface of certain of the plastics such as nylon and the like used for such a diaphragm are often smooth and as such may serve to let the tire slip from the rim at those times when the internal pressure is low. To prevent such an occurrence and to help maintain the integrity of the tire-rim diaphragm combination as an air container the edges of the novel plastic diaphragm may be perforated or embossed after the diaphragm is formed. (FIGS. 5 and 6.) The perforations allow the rubber of the tire bead to press through the plastic liner wall and grip the rim. If an embossed liner is used the embossed surface grips the rim and aids the tire to remain on the

[1] Trademark of E. I. du Pont de Nemours & Co., Wilmington, Delaware.

rim at low inflation pressure. In another modification a rubbery strip may be adhered to the surface of the plastic diaphragm along the rim engaging surfaces thereof.

While several embodiments have been given by way of example, modification may be made within the scope of the invention as limited only by the prior art and the scope of the following claims.

We claim:

1. The combination of an open-bellied tubeless tire having axially spaced annular beads for mounting on a wheel rim, an annular extensible safety diaphragm of less radial extent than the radial extent of the inner wall of said tire and having radially inner margins anchored adjacent said beads in fluid tight relation therewith and adapted to define with such rim a radial inner chamber and with said tire a radial outer chamber, and means for controlled passage of fluid to both said inner and outer chambers, said diaphragm in unstretched state having a circumferential dimension of from 85% to 50% of the circumferential dimension of said inner wall of said tire, and said diaphragm being capable of stretching correspondingly from no more than 15% to no more than 50% of its unstretched circumferential dimension, and said diaphragm having a modulus of at least 300 pounds per square inch when fully stretched in the tire.

2. The combination of claim 1 wherein said diaphragm includes means for controlled passage of fluid between said inner chamber and said outer chamber.

3. The combination of claim 1 wherein the sidewall of said tire includes means for controlled passage of fluid to said outer chamber.

4. The combination of claim 1 wherein said diaphragm is provided on its radially outer peripheral surface with a tread portion adapted to contact the inner peripheral wall surface of said tire when said outer chamber is decompressed.

5. The combination of claim 1 wherein said diaphragm is comprised of a rubbery material.

6. The combination of claim 1 wherein said diaphragm is comprised of a polyamide.

References Cited in the file of this patent

UNITED STATES PATENTS

| | | |
|---|---|---|
| 1,342,297 | Prudhomme | June 1, 1920 |
| 2,150,648 | Eger | Mar. 14, 1939 |
| 2,173,065 | Lee | Sept. 12, 1939 |
| 2,237,245 | Wilson et al. | Apr. 1, 1941 |
| 2,290,687 | Kraft | July 21, 1942 |
| 2,334,893 | Arey | Nov. 23, 1943 |
| 2,665,731 | Slezak | Jan. 12, 1954 |
| 2,756,800 | Riggs | July 31, 1956 |
| 2,811,189 | Howard | Oct. 29, 1957 |
| 2,917,096 | Snyder | Dec. 15, 1959 |

FOREIGN PATENTS

| | | |
|---|---|---|
| 1,163,953 | France | May 5, 1958 |

OTHER REFERENCES

"Two Chamber Safety Tire," Tires, T.B.A. Merchandising, June 1956, page 47.